(12) United States Patent
Blasco Claret et al.

(10) Patent No.: US 7,545,733 B2
(45) Date of Patent: Jun. 9, 2009

(54) AUTOMATIC GAIN CONTROL SYSTEM FOR MULTI-USER DIGITAL OFDM TRANSMISSION SYSTEMS OVER THE ELECTRIC NETWORK

(75) Inventors: Jorge Vicente Blasco Claret, Valencia (ES); Juan Carlos Riveiro Insua, Valencia (ES); José Abad Molina, Vélez (ES); Salvador Iranzo Molinero, Valencia (ES); Alejandro Matas Bonilla, Valencia (ES); Francisco Javier Jimenez Marquina, Valencia (ES); Nils Hakan Fouren, Barcelona (ES)

(73) Assignee: Diseno de Sistemas en Silicio, SA, Paterna (Valencia) (ES)

( * ) Notice: Subject to any disclaimer, the term of this patent is extended or adjusted under 35 U.S.C. 154(b) by 1281 days.

(21) Appl. No.: 10/715,333

(22) Filed: Nov. 17, 2003

(65) Prior Publication Data

US 2004/0120249 A1 Jun. 24, 2004

Related U.S. Application Data

(63) Continuation of application No. PCT/ES02/02235, filed on May 17, 2002.

(30) Foreign Application Priority Data

May 17, 2001 (ES) ................. 200101121

(51) Int. Cl.
H04J 11/00 (2006.01)
(52) U.S. Cl. ...................... 370/208; 370/436
(58) Field of Classification Search ........... 370/203, 370/208, 210, 436, 437, 442, 468, 204, 209, 370/211
See application file for complete search history.

(56) References Cited

U.S. PATENT DOCUMENTS

| 7,002,899 | B2 * | 2/2006 | Azenkot et al. | 370/208 |
|---|---|---|---|---|
| 7,295,518 | B1 * | 11/2007 | Monk et al. | 370/235 |
| 7,298,691 | B1 * | 11/2007 | Yonge et al. | 370/203 |
| 7,352,779 | B2 * | 4/2008 | Geile et al. | 370/507 |
| 7,391,711 | B2 * | 6/2008 | Geile et al. | 370/204 |
| 2008/0049599 | A1 * | 2/2008 | Dapper et al. | 370/208 |
| 2008/0049604 | A1 * | 2/2008 | Dapper et al. | 370/210 |

FOREIGN PATENT DOCUMENTS

WO WO 00/79748 A1 12/2000

OTHER PUBLICATIONS

Yoshiki, T, et al., High Bit Rate Transmission Scheme with a Multi-level Transmit Power Control for the OFDM Based Adaptive Modulation Systems, IEEE, 2001, 5 pages.

* cited by examiner

Primary Examiner—Chi H. Pham
Assistant Examiner—Kevin Mew
(74) Attorney, Agent, or Firm—Klauber & Jackson, LLC

(57) ABSTRACT

The system includes a plurality of user kits and a head-end kit in bi-directional communication over the electricity network. Its essential characteristics are: carrier by carrier treatment of transmission and reception signals and control of transmission power in each kit. The system makes it possible to reach the maximum the number of users, it maximizes transmission capacity, it admits signals coming from users situated at varying distances both near and far, it avoids the production of overflows, it introduces the maximum average power for the range available to the communication and it minimizes the number of bits necessary for the analog/digital conversion in reception.

25 Claims, 9 Drawing Sheets

AUTOMATIC GAIN CONTROL SYSTEM FOR MULTI-USER DIGITAL OFDM TRANSMISSION SYSTEMS OVER THE ELECTRIC NETWORK

RELATED APPLICATIONS

The present application is a Continuation of co-pending PCT Application No. PCT/ES02/02235, filed May 17, 2002, which in turn, claims priority from Spanish Application Serial No. 200101121, filed May 17, 2001. Applicants claim the benefits of 35 U.S.C. §120 as to the PCT application and priority under 35 U.S.C. §119 as to said Spanish application, and the entire disclosures of both applications are incorporated herein by reference in their entireties.

OBJECT OF THE INVENTION

The present invention, as described in the title and herein, refers to a system for automatic gain control for multi-user digital OFDM transmission systems over the electricity network. This system of automatic gain control carries out the following actions:

It avoids the production of overflows in the system devices, which would cause deterioration in the signal/noise ratio of the system.

It introduces maximum average power in the range available for the communication that is adapted to this type of channel.

Thanks to this system of automatic gain control maximum transmission capacity is achieved, the maximum number of users are reached by means of reusing frequencies and times, signals coming from users located both near and far are admitted, and the number of bits necessary for the analog/digital conversion in reception is minimized.

BACKGROUND OF THE INVENTION

It is well known that the electricity network is not a channel for static communication, or put another way, frequency response, attenuation and noise on the line vary in time, so that a configuration of gain in the transmission and reception amplifiers may be adequate at a given moment, only to become inadequate a few moments later due to a change produced by the behaviour of the network.

On the other hand, users in a communication system over the electricity network see a different channel depending on their position in relation to the head-end, so that a fixed configuration cannot be used for gains in the corresponding amplifiers when the user is connected to the system.

The electricity network behaves as a selective communications channel (being able to attenuate some carriers more than 80 dB with respect to others, or to put it another way, to have a dynamic margin greater than 80 dB). Line noise is also variable (that is, the same noise power is not always measured in reception) and various impulse noises are present. Therefore, conventional systems of automatic gain control are not adequate to be applied to a communication system over the electricity network, where it is necessary to undertake intelligent gain control.

A relevant background art can be found in document WO94/03002, which discloses a system utilizing adaptive frequency-hopped spread spectrum modulation to communicate over noisy communications channels is described. Individual packets of data are transmitted with FSK modulation using two frequencies chosen from a larger set. An error coding system is used in which data on the quality of reception at each network transceiver is used to alter the gain of the receiver, the bit rate of the transmission, and the specific frequencies employed by the network for the purpose of optimizing communication in error rate. A Master transceiver, controlling network management, transmits channel control information to other transceivers on the network, enabling system synchronization, acquisition of an existing network by new subscribers. Each transceiver comprises a frequency controlled carrier generator, a pair of digital detectors each having a frequency controlled bandpass filter microprocessors for control and broad band coupling networks for coupling the transceiver to a communications channel.

DESCRIPTION OF THE INVENTION

To achieve the objectives previously indicated, the invention as claimed comprises a system of automatic gain control for a digital OFDM transmission system over the electricity network, where various user kits and a head-end kit are in two-way communication over said network, with independent control in both the upstream channel, which runs from the user kits to the head-end, and the downstream channel, which runs from the head-end to the user kits; where the division of the electricity network for both the upstream and downstream channels occurs by means of frequency division duplexing (FDD) and/or time division duplexing (TDD); where a signal with non-constant envelope is transmitted in virtue of the OFDM modulation (orthogonal frequency division multiplexing) used; where amplifiers are included to act on gains in transmission and reception; and with the possibility of using various combinations of head-end and user kits, reusing the same frequencies and time, where access to the upstream and downstream channels occurs by means of OFDM/TDMA multiplexing (orthogonal frequency division multiplexing and/or time division multiplexing.

The novelty in the invention is the system for automatic gain control that comprises:

carrier by carrier treatment of the corresponding emission signals to pre-compensate the effects that a frequency selective channel such as the electricity network has on the signal before transformation to the time domain where the average power of the signal is fixed, carrier by carrier treatment of the signals in reception in the frequency domain, where the compensator of the effect of the channel block carries out a scaling of the received signal and the correction elements of the signal in frequency, representing by a floating point the compensated signal and fixing the number of bits of the mantissa to obtain a determined maximum precision (or signal/noise ratio) defined by the carrier, thanks to which the memories that store the compensation elements of the effect of the channel may be reduced, reducing the complexity of the operations in the frequency domain by fixing the number of bits of the mantissa to treat a greater dynamic range in the reception signals, and amplify to the maximum the signal that enters the ADC without producing overflows in the previous blocks to the frequency treatment, control of transmission power for the various kits so that the power from various users is received with the same level and to be able to use analog/digital converters of few bits, control of transmission power to ensure that the signals sent by the users to the head-end do not interfere in the functioning of other groups of head-end and users that may be using the same frequencies and times.

With these essential characteristics, the automatic gain control system of this invention achieves that:

Maximum transmission capacity is reached,

A maximum number of users are reached by means of reusing frequency and time.

Signals from nearby or distant users (in terms of electric cable length or attenuation) are admitted without deterioration of signal to noise ratio or transmission capacity, The production of overflows in the system mechanisms that would result in a loss of transmission capacity is avoided.

The use of frequencies regulated by Law or that produce interferences with other systems of communication are avoided.

Maximum average power in the frequency range available for the communication is introduced, and The number of bits necessary for the analog/digital conversion in reception is minimized.

The automatic gain control for the downstream adjusts both the gain in the transmitters of the head-end kit as well as the gain of the receivers of the user kits, adjusting gain in the head-end before adjusting reception gain in the user kits, so that maximum average power in the range available for the communication is introduced without producing overflows in the system converters with the objective of maximizing transmission capacity.

The automatic gain control of the downstream diminishes the gain in the receivers of the users in case the number of overflows produced in the ADC receiver surpasses a certain limit, because these overflows produce a reduction in the S/N ratio and, this causes a deterioration in transmission capacity.

Also, in the downstream this system of automatic gain control increases the gain in the user receivers in case overflows are not produced in the ADC receiver during a determined time window, so that the quantification noise does not limit the S/N in comparison with the amplified line noise.

A possible implementation of the corresponding algorithm of automatic gain control for the downstream channel is based on the control of aspects such as the number of overflows (saturations in the ADC receiver) produced during a certain time window and the equalization weights so that, if the number of overflows in the time window is greater than a certain threshold, gain in the receiver is reduced, while if this threshold is not surpassed for the whole window and the equalization weights indicate that the signal may increase power without producing overflows, gain in the receiver is increased; and if neither of these cases arise, the system is considered to be running at optimum level and gain in the corresponding amplifiers is not modified; a system to monitor the value of the gain is always used so as to avoid the production of oscillations in the gain and periodical verification that an increase in gain in reception does not improve the signal/noise ratio.

In the upstream connection, the automatic gain control system of this invention adjusts both gain in the head-end receivers as well as gain in the user emitters, adjusting gain in the head-end kit (in reception) before carrying out the adjustment in gain in the emitters in the user kits, with the objective of avoiding deterioration of S/N due to overflows and the quantification noise of the ADC in the head-end kit.

Furthermore, for automatic gain control presented herein, reception gain in the head-end kit is fixed in function of the noise on the line in the downstream channel, so that the head-end kit measures the power of the noise and adjusts the gain, with the objective being that quantification noise of the ADC does not limit the S/N in comparison with amplified line noise and so as to use a converter with a reduced number of bits.

The noise measurement mentioned in the previous paragraph is undertaken when the head-end uses DFT (Discreet Fourier Transform) on the received signal when no user kit is transmitting, it being able to estimate line noise by increasing gain in reception and comparing the exit of said DFT with a certain threshold when no user kit is transmitting.

Another means of undertaking this noise measurement can be starting from the error signal supplied by the reception equalizer in the head-end and from the known gains of the transmission and reception amplifiers, while some users are transmitting.

For the upstream channel the gain control of the emission amplifiers in the user kits occurs in open and/or in closed loop so as to maximize transmission capacity and reduce the number of bits necessary for the conversion in the ADC over the whole signal range:

in open loop control, by means of the power received in the down stream channel the quantity of power that should be transmitted by the upstream channel is estimated;

in closed loop control, the head-end kit receives the signal from the user kit and measures its power in reception, as well as if it produces overflows in the corresponding ADC; and starting from this measurement indicates to the user kit if it should increase or decrease the emission gain amplifier, preferably by sending control messages.

A possible implementation of the gain control algorithm in the upstream channel consists of the following:

firstly, the number of overflows in the time window are evaluated and if this value is greater than a maximum permitted threshold, the gain is lowered;

to determine which gain should be reduced (emission by the user kits or the reception in the head-end kit) the information given by the weight equalizers is used to distinguish if the overflows have been produced due to the information signal sent by the user (in which case the head en kit indicate to the user kit to lower the emission level) or if they are due to line noise (in which case it will the head-end kit that will reduce gain in reception);

gain increase, which is only used when no reasons exist to diminish gain, so that this gain increase occurs in the user kits only when it will not lead to overflows;

whatever the case a system to monitoring the value of the gain to avoid oscillations is always used;

at certain times (that are sufficiently spaced apart) the communication line is monitored to check that the fixed value for gain in reception was correct (impulse noise on the network may provoke an inadequate adjustment) and if necessary this value is modified.

To optimise gain control carrier by carrier treatment of the corresponding emission signals is used to compensate in advance for the effect of the channel on the signal, by means of increasing the power in the carriers that suffer more attenuation on being transmitted by the channel and decreasing the power in the carriers that are transmitted in the channel with less attenuation, so that average transmission power is maintained and transmission capacity can be increased without producing overflows in the treatment of the signal in time or in the analog/digital conversion.

Once of the carrier by carrier treatments can be a gradual attenuation in transmission and includes the elimination of carriers whose frequency position coincides with frequencies whose use is regulated by Law, with frequencies that interfere with other communication devices, with intermediate frequencies used in television and other electronic devices, with radio amateur frequencies, among others, and where the selection of carriers is configurable in real time according to the communication necessities of the system at each moment.

To optimise gain control, carrier by carrier treatment of the corresponding signals in reception occurs once the signal is in the frequency domain, and involves the compensator block which compensate for the effect of the channel on the received signal, scaling both the received signal in each carrier according to the level estimated for the same as well as the values of the frequency corrector elements used on the signal, so that it is possible to work only with the reception mantissa in floating point (mantissa exponent) of the received signal and finally the number of bits of this mantissa are fixed according to the maximum precision (or signal/noise ratio) of the carrier; with the objective of representing the signal with a large dynamic range (that is signals with very high or very low power) by means of a very few number of bits, reducing the size of the memories used to store the operations in the frequency domain (to have a reduced number of bits in same) and amplify to the maximum the signal at the entrance to the analog/digital conversion without producing overflows in the blocks previous to the treatment of the signal in the frequency domain carrier by carrier, receiving the carrier with greater attenuation limited in signal/noise ratio in reception by the noise on the line and not by the quantification noise of the A/D converter, and at the same time, receiving the carrier that is less attenuated by the line and amplified before the conversion without producing overflows on being conveniently scaled so that they can be treated by the frequency blocks with the same number of bits in each operation as for the carriers with greater attenuation.

In the scaling process mentioned, the signal mantissa is obtained on multiplying the signal received by the representation exponent of the floating point representation of the equalization weights and where this exponent updates itself in the equalization training phase in the grid carriers if the data sent is directed to another user and in all carriers when the data sent is directed to our user, so that the probability of an scale error due to the multiple impulsive noises that affects communication over the electricity network is reduced.

The coexistence of various groups of head-end and users in communication with the former, using the same frequencies and times (reusing frequency and time) is achieved by means of controlling transmission gains in these kits, while the means of controlling reception has been described previously, so that the various head-end kits communicate between themselves to take co-existence decisions.

Another possibility of achieving the coexistence of various groups of head-end and users in communication with the former, using the same frequencies and times (reusing frequency and time) is achieved by means of controlling transmission gains in these kits, while the means of controlling reception gains is achieved by the means previously described, so that a principal head-end kit exists that uses different frequencies and/or times for communication with its users, and is responsible for ensuring coexistence between the various groups of kits that reuse the same frequencies and times and it is capable of communication with the head-end of each group.

To optimise the gain control result when there are various groups of head-end and users reusing the same frequencies and times, transmission gains are modified carrier by carrier, or (because this implies an increase in cost), the average signal/nose ratio in frequency is estimated considering carriers with greater signal/noise ratio than those with less, and this result is used to achieve the modifications in transmission gains.

The coexistence of various groups of head-end and user kits using the same range of frequencies and time for the communications, is possible due to:
  power control in the corresponding signal emission means in both communication channels, downstream and upstream;
  a network topology where the signals from all the user kits first pass by the head-end kit corresponding to their group before arriving to the kits that make up another group; and
  measuring attenuation between the head-end kits (that reuse the same frequencies and times) by sending information between these head-end kits, or by means of communication with a principal head-end kit, so that this measure is used to adjust the maximum transmission power possible for the user kits.

For the downstream channel all the head-end kits emit at the maximum power possible for communication over the electricity network, so that the maximum value for the signal/noise (S/N) ratio in the user receptors will be limited by the attenuation between the head-end kits that reuse the same range of frequencies and times, while if there is a principal head-end (that uses another range of frequencies and/or times), it will be this principal head-end kit that will be responsible for adjusting the different gains required in the various head-end kits by means of channel control and preferably by means of control messages.

To guarantee the coexistence of various groups of kits that reuse the same frequencies and times in the upstream communication channel, transmission gain in the user kits is adjusted so that the level of signal power that reaches the head-end of another group (and that would be an interference for this group) is comparable to the level of noise on the line.

For the upstream communication channel, the head-end kit detects the power that arrives from one of its users and decides if the gain should be increased or decreased, later communicating this information to the user kit involved preferably by means of control messages; the head-end taking the corresponding decision by means of using the estimated value of the signal/noise ratio considered in frequency, prior values of said estimate and an estimation of noise.

The system described presents the possibility of achieving intelligent and efficient automatic gain control over a problematic communication means such as the electricity network, where said invention comprises the following advantages: it reaches maximum transmission capacity; it reaches the maximum number of users by means of reusing frequency and time; it admits signals from nearby or distant users; it avoids the production of overflows in the system mechanisms; introduces the maximum average power in the range available for the communication, and minimizes the number of bits necessary for the analog/digital conversion in reception.

The following drawings are provided to facilitate a better understanding of the present invention and while forming an integral part of the detailed description and the claims, they offer an illustrative but not limited representation of the principles of this invention.

DESCRIPTION OF AN EMBODIMENT OF THE INVENTION (15 to 29) Hereafter follows a description of a preferred embodiment of the invention, where the numeration used refers to the numeration on the drawings.

Figure 1:
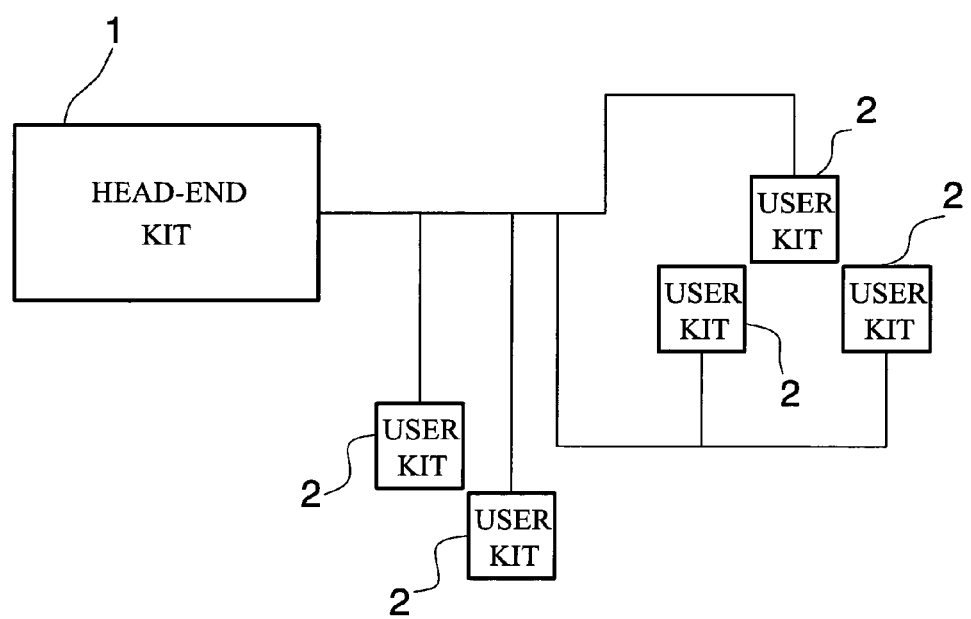
FIG. 1.—Schematically represents an example of the topology of a system that uses the automatic gain control described in the present invention.

The system of automatic gain control for digital OFDM multi-user transmission over the electricity network is applied in a communication system over the electricity network which has a multi-user topology where the head-end or central 1 transmits information to multiple user kits 2 and receives information from them as represented in FIG. 1.

This head-end transmits a broadband signal at maximum power, with non-constant envelope and high (peak to average ratio, that is the relationship between the value of signal voltage peaks squared and the average square value of the same signal). These characteristics are due principally to the OFDM modulation.

Automatic gain control is a process that acts on transmission and reception gain in the head-end 1 and in the user kits 2, with the objective of achieving that signal power will be sufficient to maximize the transmission capacity of the system. The present example consists of an independent automatic gain control for the downstream channel and for the upstream channel in the system.

The analog/digital converter (ADC) is the block that is most limited at the time of taking decisions on automatic gain control. This converter has a certain number of bits for the conversion and furthermore, a maximum entry voltage from which overflows are produced. This is the same as saying that the converter produces less quantification noise when more conversion bits are used in the corresponding ADC.

Figure 2:
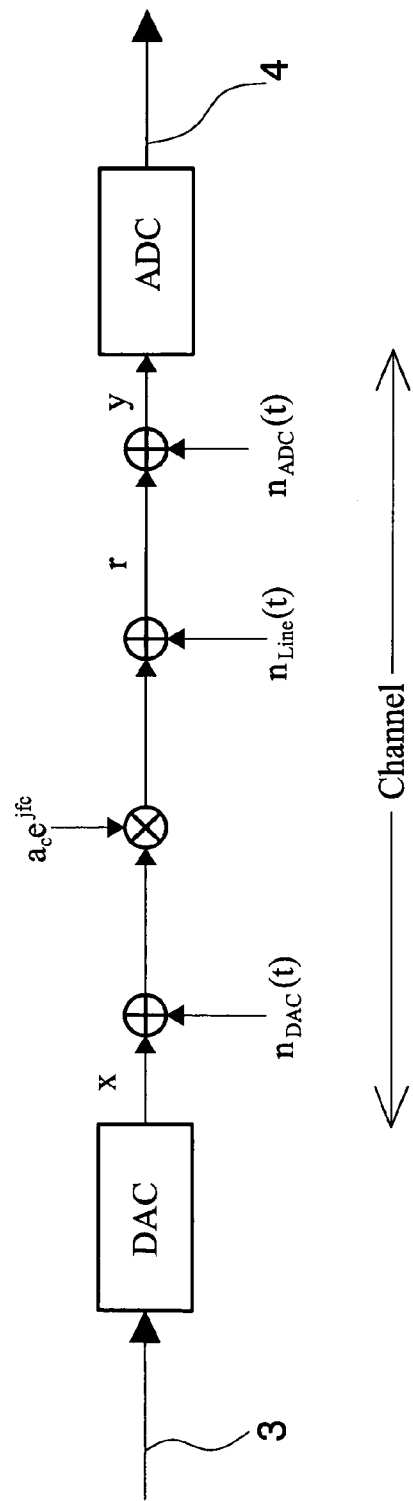
FIG. 2.—Schematically represents the effects on the signal coming from the digital/analog converter in the transmitter to the analog/digital converter in reception in a communication system over the electricity network that may use automatic gain control as represented in this invention.

The system in this example uses an ADC with a sufficient number of bits to correctly demodulate the OFDM signal (since this is one of the most costly components, the minimum of bits to correctly demodulate the OFDM signal with the maximum number of bits per carrier supported in each constellation are used). These converters in general have a range that is less than that of the line, or put in other terms, produce quantification noise above the level of background noise on the electricity line so that in the majority of cases it is this quantification noise that limits the S/N ratio. FIG. 2 demonstrates the effect that the channel has on the corresponding signal, where a signal 3 comes from the time treatment blocks of the corresponding transmitter to arrive at a converter DAC. This signal, having left said converter, is affected as it travels the channel as represented in FIG. 2, and arrives at a converter ADC whose exist signal 4 goes to the time treatment blocks in the corresponding receiver.

In FIG. 2, one may observe how the signal emitted suffers distinct changes before arriving at the receiver at the other end. In said Figure, it is supposed that the DAC and ADC converter blocks are ideal, so that quantification noise in these mechanisms is independently added as extra noise. Furthermore, the channel affects the signal in two ways: multiplying it by an attenuation and a phase $a_c e^{jfc}$ that can vary from carrier to carrier and adding additive noise to the signal. In mathematical form the received signal will be:

$$Y = r + n_{ADC\,(t)} = (x + n_{DAC}(t)) \cdot a_c e^{jfc} + n_{l\,nea}(t) + n_{ADC}(t)$$

Figure 3:
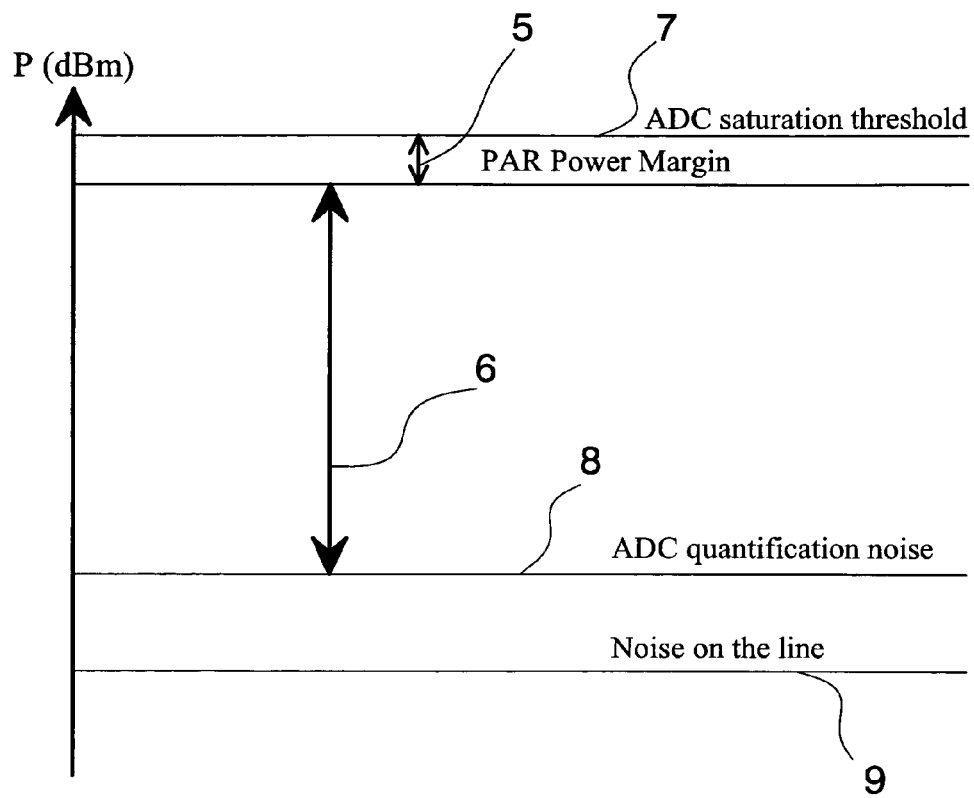
FIG. 3.—Schematically represents the levels of power in reception in a communication system over the electricity network using the automatic gain control represented in this invention.

FIG. 3 shows average power of the signal measured in the time domain (before realizing the corresponding DFT) for a determined band width along with the margins of the analog/digital converter of the receiver.

In said FIG. 3, power in dBm is shown on the vertical axis. The arrow 5 represents the power margin for the PAR: The level 7 represents the saturation threshold of the ADC that is a fixed value chosen by the ADC selection. The level 8 represents quantification noise of the ADC, which is also a fixed value chosen by the ADC selection, and the level 9 represents noise on the line. The arrow 6 represents the maximum margin of the detectable S/N ratio with the converter ADC that corresponds to the difference between the levels 7 and the maximum between 8 and the 9.

Changes in reception gain take into account the effects of the ADC converter.

Receptor gain is lowered when the received signal arrives above the overflow voltage threshold of the ADC. Amplifier gain in reception is lowered until it achieves that the maximum level for the signal is at saturation level for the ADC so that the maximum S/N range for the system is achieved.

Figure 4:
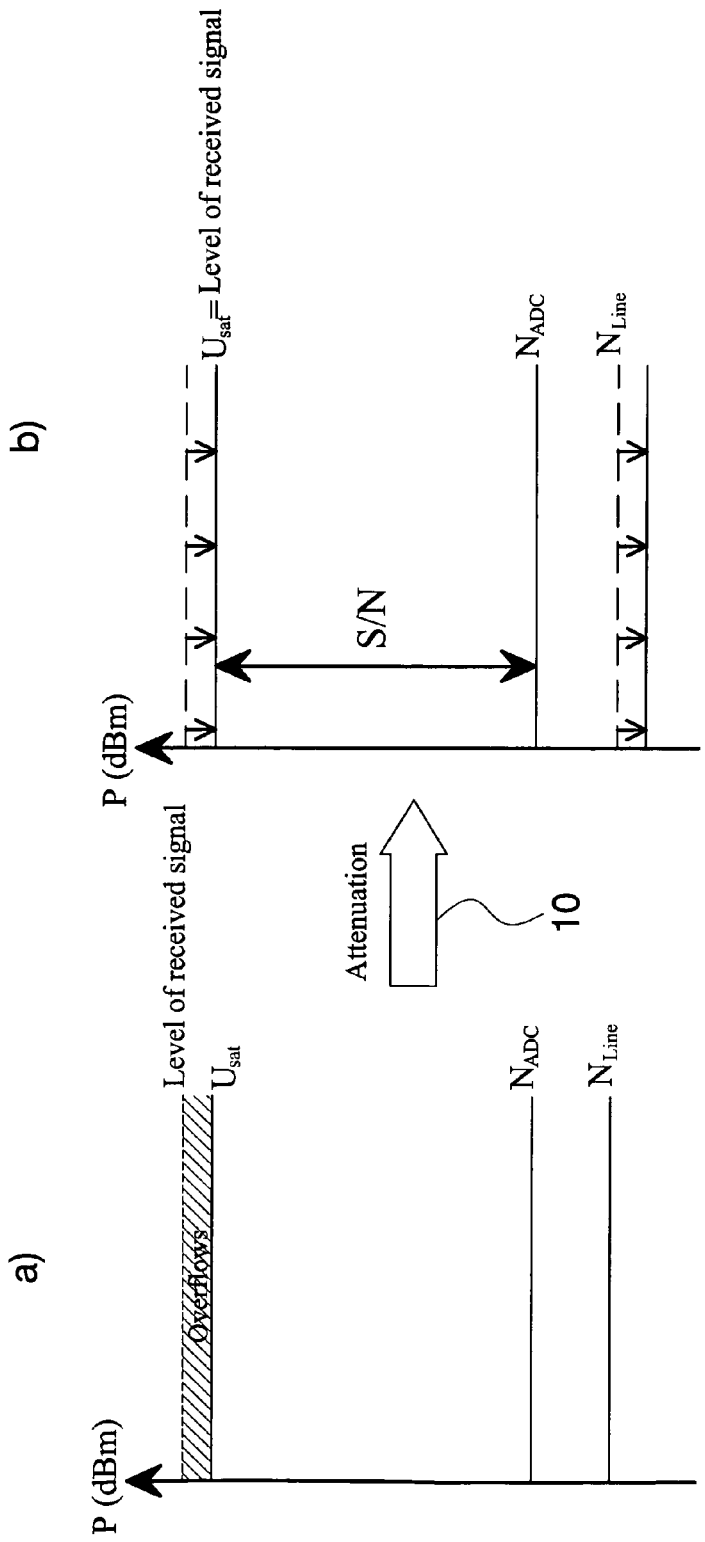
FIG. 4.—Schematically represents the decrease in gain in case of overflow in the communication system over the electricity network and suitable to incorporate the automatic gain control as represented in this invention.

FIG. 4 shows the decrease in gain in case of overflows. Part a of FIG. 4 shows the level of line noise in reception ($N_{l\,nea}$), the level of quantification noise in the ADC ($N_{ADC}$), the saturation threshold ($U_{sat}$) and the level of received signal. Following adequate attenuation due to the gain control system, represented by the arrow 10, one arrives at the situation shown in part b of FIG. 4, that shows the variation in the levels, demonstrating the decrease in the level of the received signal.

In mathematical form, it is:

$$P_r > U_{sat}, \text{ideally } G = U_{sat} - P_r < 0$$

$$S/N = (P_r + G) - \max(N_{ADC}, N_{l\,nea} + G) = U_{sat} - N_{ADC}$$

On the other hand, positive amplification in the receiver is also limited by the presence of the analog/digital converter. On amplifying the received signal not only are we increasing the desired signal sent to the other extreme of the communication channel, we are also amplifying line noise added to the received signal while travelling the channel. The sum of both noises will be the limit of the S/N ratio in reception. When amplified line noise is sufficiently greater than ADC quantification noise, it will be this noise that will limit the signal/noise ratio in the receiver (which occurs when it is at least 12 dB greater). Increasing the gain starting from this point will not lead to any improvement. When the difference between the power levels (in logarithm scale) in the quantification noise and amplified line noise is greater that 12 db, one may assume that total noise will be approximately equal to amplified line noise, and beginning from this point no improvement will be produced in the signal/noise ratio on amplifying the gain in reception.

Figure 5:
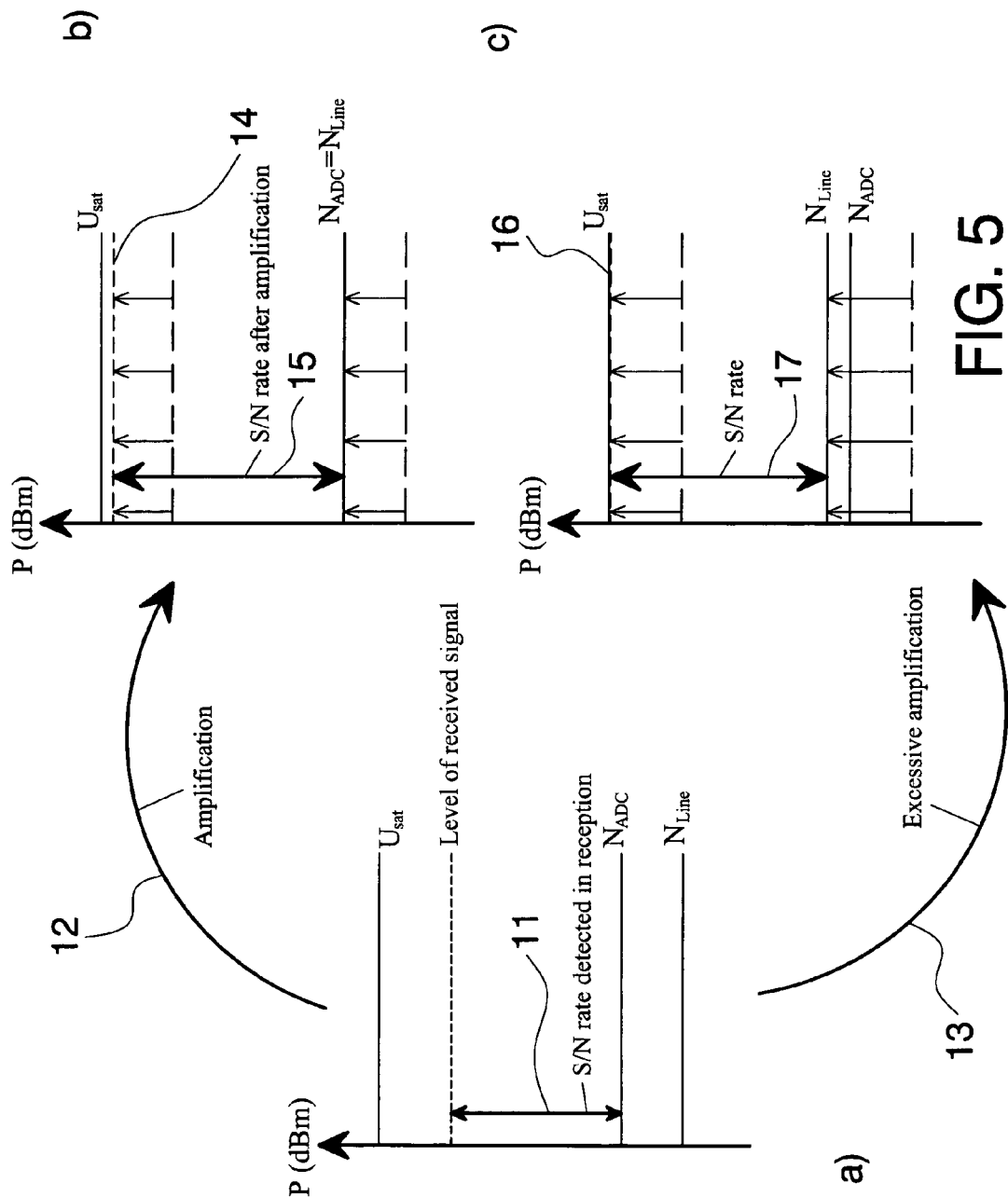
FIG. 5.—Schematically represents the increase in gains in reception in a communication system over the electricity network and suitable to incorporate the automatic gain control as represented in this invention.

In part a of FIG. 5 the margin indicated by 11 indicates the signal/noise ratio detected in reception in the case of reception without amplification. Starting from the situation in part a, and following adequate amplification (represented by the arrow 12) one arrives at the situation depicted in part b, where the reference 14 shows the signal level following amplification, and the reference 15 shows the S/N ratio before amplification.

However, if, starting from the situation in a excessive amplification takes place, that is grater than $N_{ADC}+12$ Db$-N_{l\,nea}$, which is represented by the arrow 13, one arrives at the situation shown in part c of FIG. 5, where the reference 16 shows the signal level following amplification, while 17 shows the signal/noise ratio which does not improve in case the amplification is exactly equal to $N_{ADC}+12$ Db$-N_{l\,nea}$, because now the noise that limits the S/N is approximately equal to amplified line noise.

In mathematical form, if:

$$P_r < U_{sat}; \text{ideally } G = \min(U_{sat} - P_r, N_{ADC} + 12\,Db - N_{l\,nea})$$

$$\text{Without saturatio } S/N = (P_r + G) - \max(N_{ADC}, N_{l\,nea} + G) = P_r - N_{l\,nea};$$

If $G > N_{ADC} + 12\,dB - N_{l\,nea}$ $$S/N = (P_r + G) - \max(N_{ADC}, n_{L\,NEA} + G) = P_r - N_{l\,nea}.$$

Automatic gain control for the downstream channels aims to maximize transmission capacity from the head-end 1 to the user kits 2.

As an mere example of embodiment and, in order to simplify the process of adjusting gains in transmission and reception, in the downstream link the system puts the maximum possible gain in transmission of the head-end 1 before adjusting gain in the receivers of the user kits 2. This is because a change made in the transmission by the head-end 1 would affect all the users 2, and using the maximum possible gain (limited by regulation) helps to achieve the largest possible coverage.

Gain in the user receiver is adjusted as described in the previous point, that is, taking care that it does not produce overflows and injecting the maximum power in the range available (to maximize transmission capacity).

A possible implementation of the automatic gain control algorithm to achieve both of the previous objectives is based in the control of various aspects of the system: principally, the number of overflows (in this case, saturations in the receiver ADC) produces during a certain time window and the weights of the signal on leaving the equalizer. If the number of overflows in the time window is greater than a certain threshold gain in the receiver is reduced, because this would deteriorate the S/N. If this threshold is not surpassed during the window and the equalization weights indicate that signal power can be increased without producing overflows, gain in reception is increased. If neither of these two cases apply, the system is at the optimum level and it is not necessary to modify amplifier gain. In, all cases a gain value monitoring system is used to avoid the production of oscillations in same by the automatic gain control. Furthermore, a check is also made to see that increase in reception gain does not improve S/N, which is at optimum value.

On the other hand, automatic gain control for the downstream channel, adjusts both the receiver gain in the head-end 1 and the transmission gain in the user kits 2. In the same way as it happens for automatic gain control in the downstream channel, the gain in the head-end (this time in reception) is adjusted and fixed before adjusting transmission gain in the user kits, so as to avoid saturation and to allow good communication with each kit.

Reception gain in the head-end is fixed in function of line noise. For this the central kit or head-end measures this noise and adjusts gain so that amplified line noise does not surpass quantification noise in the analog/digital converter by more than 12 dB.

There are ways in which the head-end 1 can make this measurement. The following are two possible implementations:

a. When there are no users transmitting information, the central kit uses the DFT to measure noise on the line.

b. Beginning from the error signal weights of the equalizer an estimation of the characteristics of the channel is made. The error signal of the equalizer algorithm is a good estimation of noise on the line because the power sent from the other end is a constant value.

On the other hand, gain control in the transmission amplifier of the user kits 2 is also undertaken. This control takes place in open and closed loop:

In the open loop control the received power in the downstream link serves to estimate how much power should be transmitted by the upstream link.

In closed loop control, the head end kit 1 receives the signal from the users 2 and measures its power in reception (as well as if it produces overflows in the ADC). Beginning from this measurement it tells the user kit 2 to increase or decrease transmission amplifier gain using the control channel (preferable by sending control messages).

An example of a possible implementation of the gain control algorithm in the upstream channel follows. Firstly, the number of overflows in the time window is measured and if this value is greater that a certain threshold the value on exiting the equalizer is used to determine which gain must be reduced.

To determine which gain should be reduced (that of transmission in the user kits or of reception in the head-end), the information given in the weights on exiting the equalizer is used to distinguish if the overflows were produced as a result of the information signal sent by the user (in which case the head-end indicates to the user kit to lower its transmission) or if it is due to amplified line noise (in which case the head-end kit 1 will reduce gain in reception). Increasing gain only takes place if no reasons to reduce gain exist. Gain increase takes place in the user if no overflows are produced.

In both cases monitoring the value of the gain takes place so as to avoid oscillations.

From time to time (a sufficiently large time period) the line is monitored to check that the fixed value for reception gain is correct (impulse noise may cause an inadequate adjustment) and this value is modified if it is not correct.

Automatic gain control is especially important to be able to apply OFDMA (multiple access orthogonal frequency division) without producing overflows in the various internal blocks. In this case, reception gain in the head-end 1 is fixed to maintain the S/N margin and since there are various users transmitting at the same time in different frequencies (signals from different users arrive in the same signal), reception-gain in the head-end cannot be adapted to each one of these. Reception gain adapts to the greatest, and in the frequency domain (following DFT) carrier by carrier treatment is undertaken so as to maintain the S/N margin with the fixed gain and to reduce possible overflows.

To optimise gain control in both channels, upstream and downstream, carrier by carrier treatment of the corresponding emission signals is undertaken. This treatment pre-compensates the effects of the channel (attenuating to a greater extent the carrier that will be less attenuated and vice versa. Furthermore, this carrier by carrier treatment can be used to gradually attenuate (in which case the carriers attenuated can continue to be used in the communication) or even eliminate (that is to say, no transmission by the eliminated carriers) the carriers whose frequencies are regulated by Law for use in other telecommunication systems (such as by radio amateurs), or for frequencies that may interfere with other communication equipment. The selection of which carriers will be attenuated or eliminated, and the degree of attenuation (in this case) is configurable in each kit in real time, so that they comply with the installation standards for the system and with the communication needs for the system at each moment. A possible form of implementing this is by using a power mask which in transmission, involves the multiplication of each carrier by a determined coefficient.

On the other hand, in reception, during equalization, the equalization weights are coded in floating point so that on leaving the FFT the signal can be scaled with the exponent calculated by the equalization weights. By multiplying the received signal by these exponents, that is by scaling, it is possible to work with the mantissa that has few bits.

Figure 6:
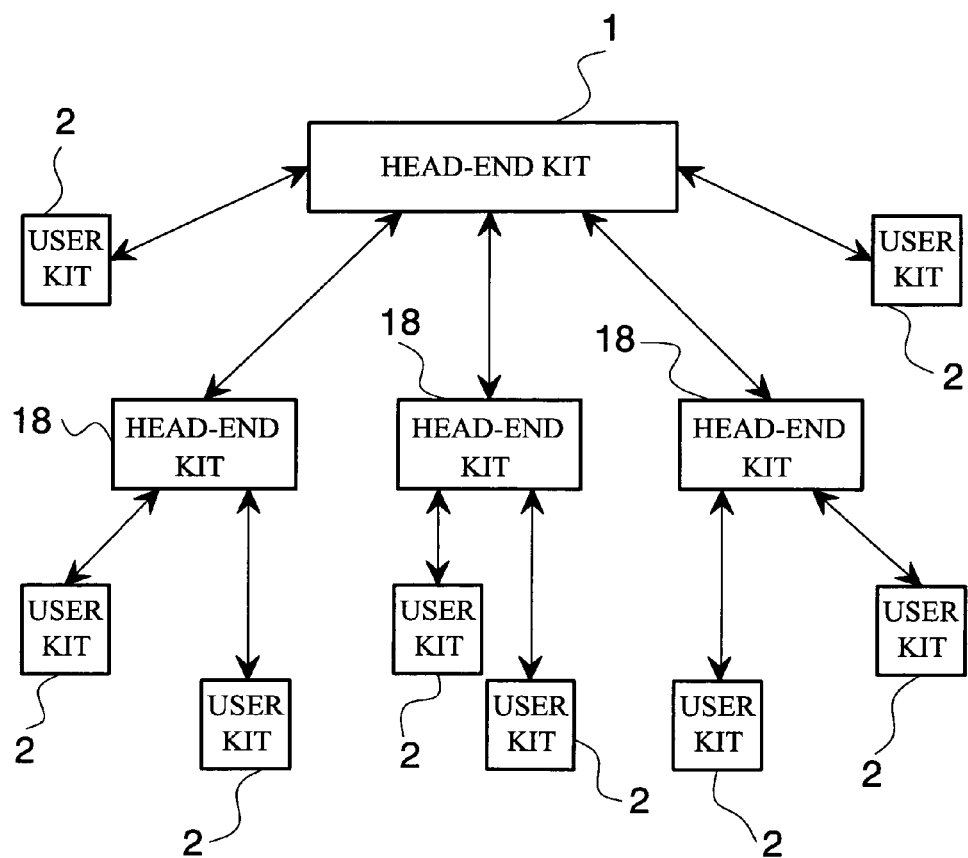
FIG. 6.—Schematically represents a logical topology with various head-ends in a system using the automatic gain control of this invention.

FIG. 6 shows a logical topology for various head-ends 18 within the corresponding communication system over the electricity network. The use of multiple head-ends 18 allows the creation of head-end groups 18 plus users 2 so that it is possible to undertake independent communication between these two kits or to achieve that user kits that are situated at long distances for the principal head-end kit 1 (in terms of length of electric cable of attenuation) can communicate.

In order that the communication of the principal head-end kit 1 and that of the head-end kits 18 do not interfere with each other, different frequencies and/or times are used in both communications. A group of frequencies and time that can be used for communication with the system of the present description is called a "link". In each group time and frequencies are re used, that is the same times and frequencies are used in the transmissions by the head-end groups 18 and their users 2, so that the signals from one group may interfere or be interfered with by the signals of the other group.

In one implementation of the invention, the "link" can consist of utilizing the frequencies situated between 1 and 5 MHz for the transmission, while another consists of transmitting between 5 and 10 Mhz. All the kits employ a "link" using one or these groups of frequencies and therefore may interfere with each other.

Communication between the principal head-end kit 1 and the user kits 2 takes place via a "link", while communication between the head-end kit 18 and its users occurs via another "link", thereby avoiding interference between the two communications.

The head-ends of these groups 18 share the same "link", that is, they transmit using the same frequencies and times. For this reason the signal in the head-end 18 and its user kits 2 is interfered by another head-end 18 and its users 2, and vice versa. The topology of the electricity network can be used so as to situate a head-end of a group 18 and users 2 sufficiently distant (in terms of length of electric cable or attenuation) so that the signals sent in both channels (upstream and downstream) do not produce high interference.

Due to the presence of these interfering groups a reduction in the signal/noise ratio is produced in the upstream and downstream channels of the groups of head-ends 18 and their users 2.

The novelty in this present system with regard to this point is the form in which the coexistence of various head-ends 18 of groups and their users 2 is allowed. For this we will base ourselves principally in controlling transmission power.

Figure 7:
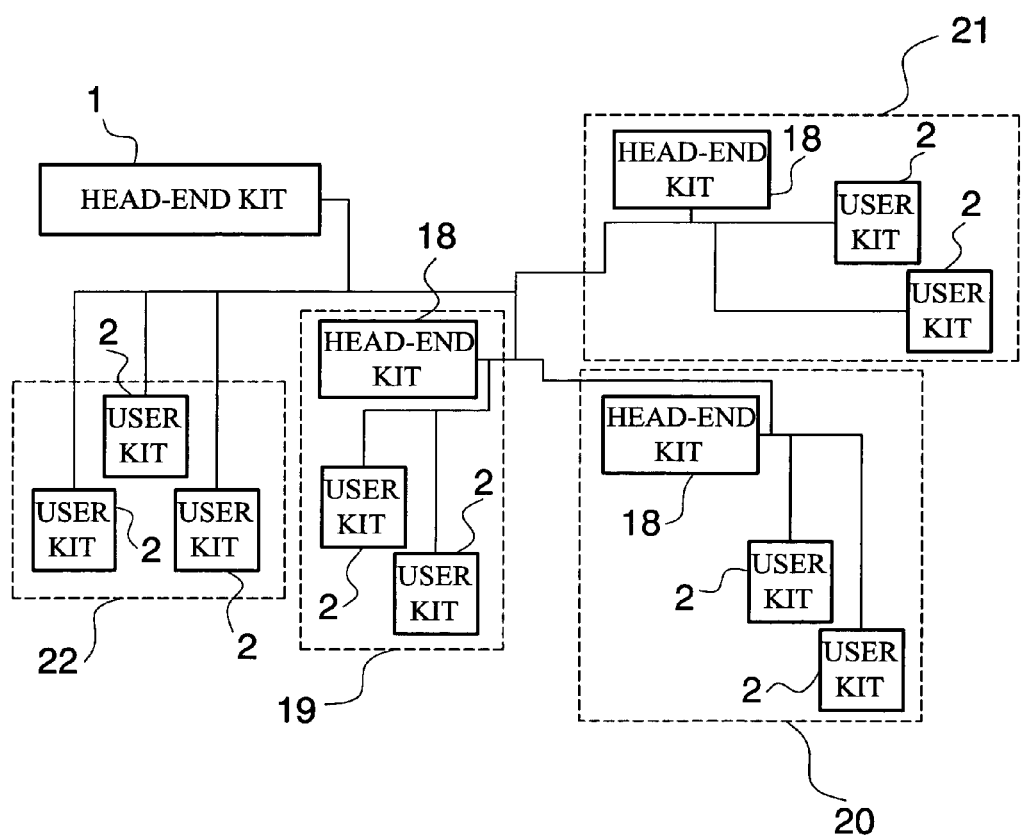
FIG. 7.—Schematically represents a physical topology with various head-ends in a system using the automatic gain control of this invention.

FIG. 7 shows an example of the physical connection between two distinct kits (over the electricity line) showing the location of the head-end kits 18 and the user kits 2 in four different buildings 19 to 22.

To undertake automatic gain control it is supposed that the signal sent by the user kits 2 arrives at a head-end kit 18 that it not of its group, it will have to travel a long distance and to pass the point on the network where it will connect with the head-end kit 18 for its group. This is easily achieved with the topology of the electricity distribution network. For example, the head-end kits 18 can be located at the point of electricity input for the building and the user kits 2 within the building, as is shown in FIG. 7. Coexistence between the groups of head-ends 18 and their users 2 is based on the fact that all the users 2 attached to a particular head-end 18 always pass by the point where this head-end 18 connects to be able to reach another head-end 18 that is not if its group. For this we measure attenuation between the head-ends 18, something that can be done automatically by means of sending information between the head-end kits 18 and/or 1. This value serves to adjust the maximum transmission power for the users, as we have seen previously.

In the downstream channel, the signal in the neighbouring head-end kit 18 may get mixed with the signal from the head-end 18 in our group. This interference introduces noise of the type additive white gaussian noise in the system (due to the fact that the distribution statistics of the OFDM signal with approximately a thousand carriers modulated in M-QAM, is practically normal). The user receives both signals (that of its head-end and that of the neighbouring head-end). The signal of the head-end 18 of our group will be attenuated proportionally to the distance from the user kit 2 to its head-end 18, while the signal of the "interfering" head-end 18 will be attenuated proportionally to the distance between the user kit 2 and the other head-end 18. If the "interference" is greater than noise on the line, the degradation in the S/N will be caused principally by this interference, so that the S/N will be the difference between the power of the signals, that is directly proportional to the attenuation existing between both head-end kits 18.

Figure 8:
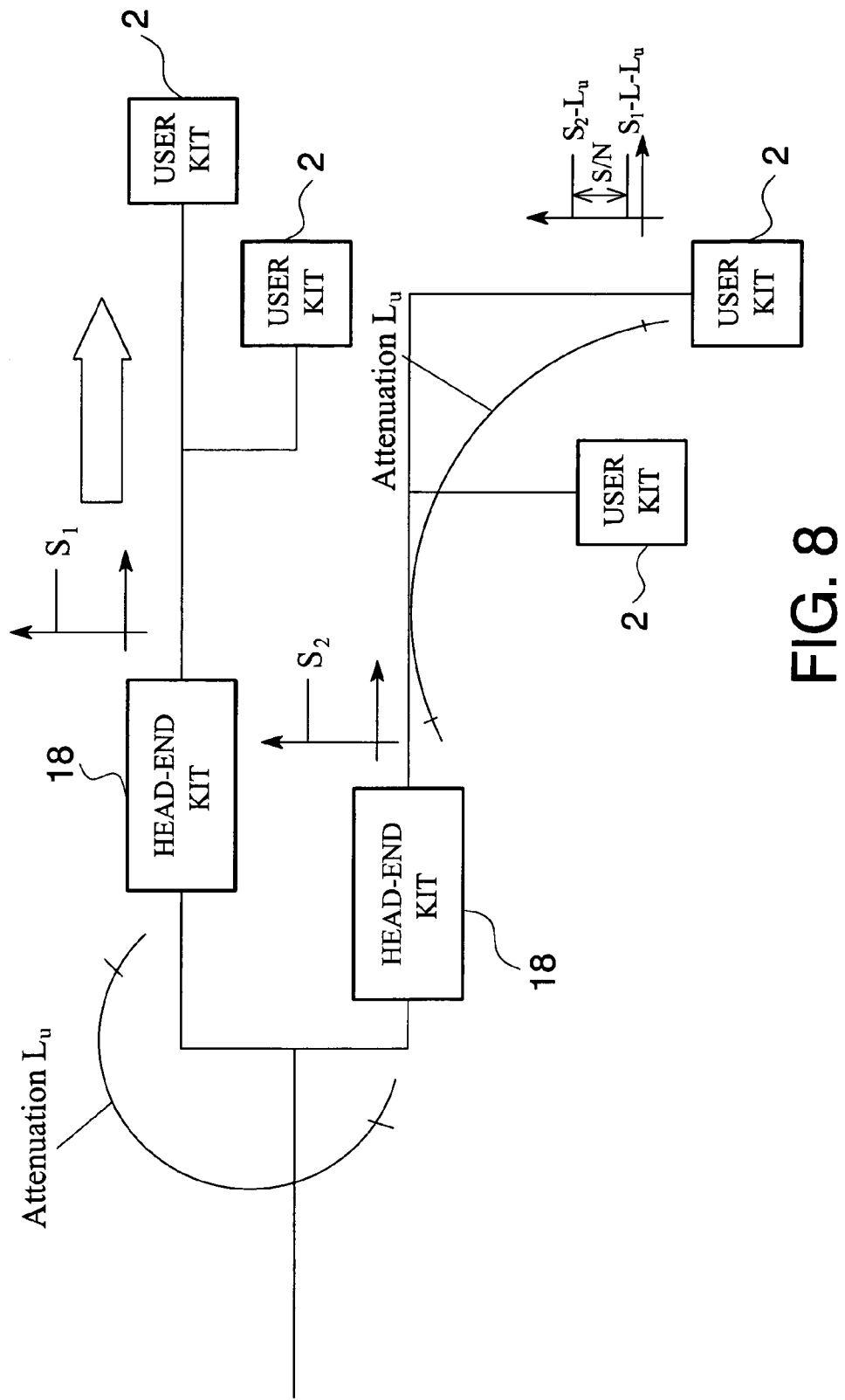
FIG. 8.—Schematically represents the interference between various head-ends in the downstream channel of a communications system over the electricity network that uses the automatic gain control of this invention.

FIG. 8 shows the interference between head-ends 18 of different groups plus users 2 for the downstream channel.

Mathematically the signal received by a user 2 from its head-end kit 18 will be:

$$P_r = S_2 - L_u$$

where $S_2$ is the signal power sent by the head-end 18 and $L_u$ the attenuation created principally by the distance that exists (the electricity line) between the head-end 18 and the user 2. On the other hand, the interfering signal (sent by the head-end kit 18 of the other group) will be:

$$P_i = S_1 - L - L_u$$

where $S_1$ is the power of the signal sent by the head-end 18 of the other group and L the attenuation between the head-end kits 18. Normally this interfering power will be greater than the quantification noise of the user ADC receiver, so that the S/N margin will be:

$$S/N = P_r - \max(N_{ADC}, P_i) = P_r - P_i = S_2 - L_u - (S_1 - L - L_u) = S_2 - S_1 + L$$

All the head-end kits 18 transmit with maximum power (to have reciprocal interference and maximize coverage), so that the maximum value of the S/N will be equal to the attenuation between the head-end kits (L).

With more than two "links", the attenuation between the head-ends 18 may not be equal, because a head-end 18 can see the other groups with greater attenuation and may have greater gain. In this case the principal head-end kit 1 will be responsible for adjusting the gains by means of control messages (or another type of channel control).

With respect to the upstream channel, the objective is that the signals that come from another head-end 18 of another group plus the users 2 arrive at our group (whose kits are from the same "link", that is using the same time and frequencies) with a level of power comparable to the level of background noise in the electricity distribution network.

If the two power levels are equal, an increase of 3 dB over the noise floor is produced which is considered to be an acceptable degradation in the upstream channel.

Figure 9:
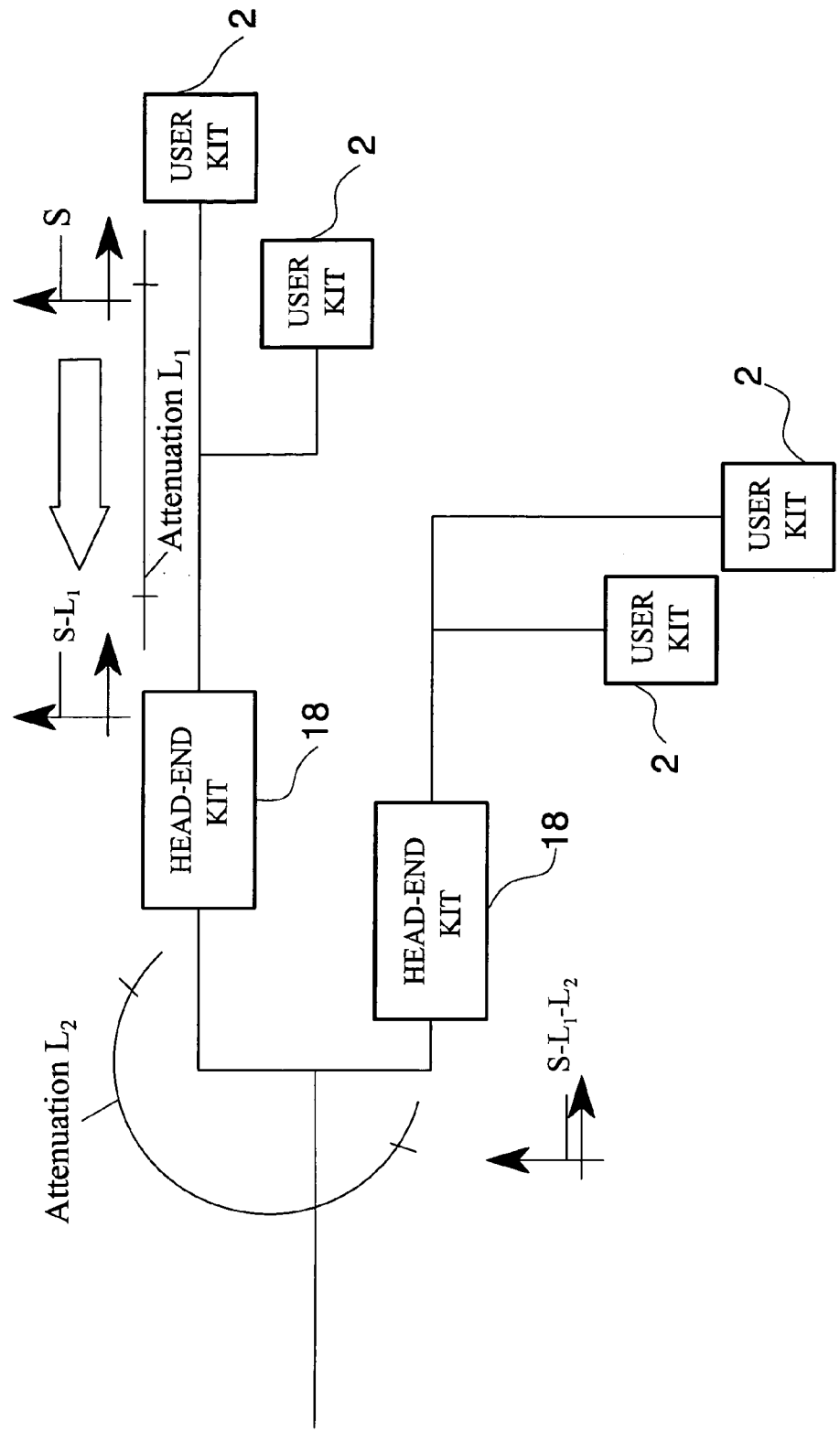
FIG. 9.—Schematically represents interference in the upstream channel of a communications system over the electricity network that uses the automatic gain control of this invention.

As a consequence, the user kits 2 must adapt transmission gain to ensure that the signal that arrive at the head-end 18 of the other group will do so with power values that are less or equal to the detected line noise for this head-end 18. The detection takes place in the head-end 18 of each group and the users 2 of the group are informed using control messages (or another type of channel control). Therefore, the adjustment takes place with a control in closed loop. This is demonstrated in FIG. 9 where interference in the upstream channel is shown.

The user kit 2 transmits a signal in the upstream channel with power S. This signal arrives attenuated at the head-end 18 of the group (attenuation $L_1$) and to the head-end 18 of the other group attenuated with this value plus the attenuation characterized between the head-ends 18 ($S - L_1 - L_2$). This signal is considered a noise for other groups (that reuse the same frequencies and times) so the value of S is adjusted modifying the transmission of the user kit 2 in order that $S - L_1 - L_2$ will be at the noise floor level on the line.

Mathematically the power interference will be:

$$P_i = S - L_1 - L_2$$

And one may say that $N < P_i$ (if it is greater than noise caused by other factors such as ADC).

To optimise the result, and because the channel does not have a uniform response in frequency, transmission gain must be changed carrier by carrier. Since this would increase costs substantially, one can take an average estimate of S/N in frequency using more often carriers with a greater S/N value than those with less.

These operations take place in the head-end kit 18 corresponding to the group, which decides if the gains of the various users 2 of this group should be increased, decreased or maintained. Afterwards it communicates this information to the users 2 by means of a control channel (preferably by control message). To take this decision it uses the weighted value of the S/N estimation and previous values of this estimation.

The invention claimed is:

1. Automatic gain control system for a digital OFDM multiuser transmission system over the electricity network, comprising a number of user kits (2) and a head-end kit (1) in two-way communication over the electricity network, with independent control for both an upstream channel which runs from the user kits (2) to the head-end kit (1), and a downstream channel which runs from the head-end (1) to the user kits (2), where a division of the electricity network for both the upstream and the downstream channels is accomplished with frequency division duplexing (FDD) means and/or time division duplexing (TDD) means, where a signal is transmitted with OFDM (orthogonal frequency division multiplexing) modulation means resulting in a signal with non-constant envelope; and comprising amplifiers acting on transmission and reception gains, enabling to use various combinations of head-end (1) and user kits (2), that reuse same frequencies and times, where access to the upstream and downstream channels is accomplished with OFDMA/TDMA (orthogonal frequency division/time division) multiplexing means wherein said Automatic Gain Control System comprises:

carrier by carrier treatment means for emission signals, which attenuate to a greater extent carriers that less attenuated by the channel, and which attenuate to a lesser extent carriers more attenuated by the channel; in order to compensate in advance an effect that a frequency selective channel, as the electricity network, has on the signal before being transformed to a time domain where average power of the signal is fixed, carrier by carrier treatment means for received signals in the frequency domain, where a block that compensates an attenuation caused by the channel carries out a scaling in frequency of the received signal and of elements that correct the signal, representing the compensated signal by a floating point and fixing a number of bits of a mantissa to obtain a determined maximum precision, or signal/noise ratio defined by carrier, transmission power control means that control the transmission power from various kits (2) with means that increase the power in the carriers that suffer more attenuation on being transmitted by the channel, and decreasing the power in the carriers that are transmitted by the channel with less attenuation; in order to achieve that the power for various users (2) is received with a same level and to enable to use analog/digital converters of few bits, transmission power (S) control means that control the transmission gains in the head-end and user kits; in order to ensure that the signals sent by the users (2) to the head-end (18) do not interfere in a functioning of other groups of head-end (18) and users (2) that may be using the same frequencies and times.

2. Automatic gain control system for a digital OFDM multiuser transmission system over the electricity network, according to claim 1, wherein the automatic gain control system (10) for the downstream is provided with adjustments means to adjust both gain in the transmitters of the head-end kit (1) as well as gain in the receivers of the user kits (2), in order to introduce maximum average power in the range available for the communication without producing overflows in the system converters for maximizing transmission capacity.

3. Automatic gain control system for a digital OFDM multiuser transmission system over the electricity network, according to claim 2, wherein the automatic gain control system (10) for the downstream diminishes gain in the receivers of the users (2) in case the number of overflows produced in the ADC receiver surpasses a certain limit, in order to avoid a deterioration in transmission capacity due to overflows which produce a reduction in the S/N ratio.

4. Automatic gain control system for a digital OFDM multiuser transmission system over the electricity network, according to claim 2, wherein the automatic gain control system (10) in the downstream increases gain in the user receivers (2) in case overflows are not produced in the ADC receiver during a determined time window, in order to prevent the quantification noise (8) from limiting the S/N (6) in comparison with the amplified line noise ($N_{line}$+G), where $N_{line}$ is the line noise and G is the gain.

5. Automatic gain control system for a digital OFDM multiuser transmission system over the electricity network, according to any of claims 2 to 4, wherein the automatic gain control system (10) for the downstream channel is based on control means that control the number of overflows, saturations in the ADC receiver (7) produced during a certain time window, and equalization weights, in order to reduce the gain in the receiver if the number of overflows in the time window is greater than a certain threshold; in order to increase the gain in the receiver if this threshold is not surpassed for the whole window and the equalization weights indicate that the signal may increase power without producing overflows; and in order to not modify the gain in the corresponding amplifiers, since the system is considered to be at the optimum level if neither of these cases arise; a system to monitor the value of the gain is always used so as to avoid the production of oscillations in the gain and periodic verification that an increase in gain in reception does not improve the signal/noise ratio (6).

6. Automatic gain control system for a digital OFDM multiuser transmission system over the electricity network, according to claim 1, wherein the automatic gain control system (10) in the upstream channel is provided with adjustment means to adjust both gain in the head-end (1) receivers as well as gain in the user (2) emitters, adjusting the gain in the head-end kit (1) in reception before carrying out the adjustment in gain in the emitters in the user kits (2), in order to avoid deterioration of S/N (6) due to overflows and the quantification noise of the ADC (8) in the head-end kit (1).

7. Automatic gain control system for a digital OFDM multiuser transmission system over the electricity network, according to claim 6, wherein the automatic gain control system (10) for the upstream channel, fixes the gain in reception of the head-end kit (1) in function of the noise on the line (9), therefore the head-end kit (1) measures the power of the noise (9) and adjusts the gain, in order to prevent the quantification noise of the ADC (8) from limiting the S/N (6) in comparison with amplified line noise ($N_{line}$ +G) and in order to enable the use a converter with a reduced number of bits where $N_{line}$ is the line noise and G is the gain.

8. Automatic gain control system for a digital OFDM multiuser transmission system over the electricity network, according to claim 7, wherein noise (9) measurement is carried out by the head-end (1) which uses DFT (Discreet Fourier Transform) on the received signal when no user kit (2) is transmitting, it being able to estimate line noise (9) by increasing gain in reception and comparing the exit of said DFT with a certain threshold when no user kit (2) is transmitting.

9. Automatic gain control system for a digital OFDM multiuser transmission system over the electricity network, according to claim 7, wherein said noise (9) measurement is accomplished starting from the error signal supplied by the reception equalizer in the head-end (1) and from the known gains of the transmission and reception amplifiers, while some users (2) are transmitting.

10. Automatic gain control system for a digital OFDM multiuser transmission system over the electricity network, according to claim 6, wherein for the upstream channel, the gain control system controls the emission amplifiers in the user kits (2) in open loop and/or in closed loop in order to maximize transmission capacity and reduce the number of bits necessary for the conversion in the ADC over the whole signal range, wherein:

in open loop control, the quantity of power that should be transmitted by the upstream channel is estimated by means of the power received in the down stream channel; and in closed loop control, the head-end kit (1) receives the signal from the user kit (2) and measures its power in reception, as well as if it produces overflows in the corresponding ADC; and starting from this measurement indicates to the user kit (2) if it should increase or decrease the emission gain amplifier, preferably by sending control messages.

11. Automatic gain control system for a digital OFDM multiuser transmission system over the electricity network, according to any of claims 7 to 10, wherein the gain control system works with an algorithm in the upstream channel that comprises:

evaluating firstly, the number of overflows in the time window and lowering the gain if the number of overflows in the time window is greater than a maximum permitted threshold;

to determining which gain should be reduced, emission by the user kits (2) or the reception in the head-end kit (1) use, the information given by the weight equalizers in order to distinguish if the overflows have been produced due to the information signal sent by the user, in whose case the head-end kit (1) indicates to the user kit (2) to lower the emission level, or if they are due to line noise (9), in whose case it will be the head-end kit (1) that will reduce gain in reception;

gain increase, which is only used when no reasons exist to diminish gain, so that this gain increase occurs in the user kits (2) only when it will not lead to overflows;

a system to monitoring the value of the gain to avoid oscillations is always used;

at certain times, that are sufficiently spaced apart, the communication line is monitored to check that the fixed value for gain in reception was correct, impulse noise on the network may provoke an inadequate adjustment, and if necessary this value is modified.

12. Automatic gain control system for a digital OFDM multiuser transmission system over the electricity network, according to claim 1, wherein to optimise gain control a carrier by carrier treatment of the corresponding emission signals is used to compensate in advance for the effect of the channel on the signal, by means of increasing the power in the carriers that suffer more attenuation on being transmitted by the channel and decreasing the power in the carriers that are transmitted in the channel with less attenuation, so that average transmission power is maintained and transmission capacity can be increased without producing overflows in the treatment of the signal in time (4) or in the analog/digital conversion.

13. Automatic gain control system for a digital OFDM multiuser transmission system over the electricity network, according to claim 12, wherein among the carrier by carrier treatments in transmission there is a gradual attenuation that includes elimination of carriers whose frequency position coincides with frequencies whose use is regulated by Law, with frequencies that interfere with other communication devices, with intermediate frequencies used in television and other electronic devices, with radio amateur frequencies, and the like, and where the selection of carriers is configurable in real time according to the communication necessities of the system at each moment.

14. Automatic gain control system for a digital OFDM multiuser transmission system over the electricity network, according to claim 1, wherein in order to optimise gain control, carrier by carrier treatment of the corresponding signal in reception is carried out, once in the frequency domain, consisting in that the block that compensates the effect of the channel on the received signal scales both the received signal in each carrier according to the level estimated for the same as well as the values of the frequency corrector elements used on the signal, so that it enables to work only with the reception mantissa in floating point, mantissa and exponent, of the received signal and finally the number of bits of this mantissa is fixed according to the maximum precision, or signal/noise ratio, of the carrier; in order to represent the signal with a large dynamic range, that is signals with very high or very low power, by means of a very few number of bits, reducing the size of the memories used to store the operations in the frequency domain to have a reduced number of bits in same and amplify to the maximum the signal at the entrance to the analog/digital conversion without producing overflows in the blocks previous to the treatment of the signal in the frequency domain carrier by carrier, receiving the carrier with greater attenuation is limited in signal/noise ratio in reception by the noise on the line and not by the quantification noise of the A/D convener, and at the same time, receiving the carrier that are less attenuated by the line and amplified before the conversion without producing overflows on being conveniently scaled so that they can be treated by the frequency blocks with the same number of bits in each operation as for the carriers with greater attenuation.

15. Automatic gain control system for a digital OFDM multiuser transmission system over the electricity network, according to claim 14, wherein in the scaling process, the signal mantissa is obtained on multiplying the signal received by the exponent of the floating point representation of the equalization weights, and where this exponent updates itself in the equalization training phase in the grid carriers if the data send is directed to another uses and in all carriers when the data sent is directed to our user, so that the probability of an scale error due to the multiple impulsive noises that affect communication over the electricity network is reduced.

16. Automatic gain control system for a digital OFDM multiuser transmission system over the electricity network, according to claim 1, wherein the coexistence of various groups of head-end (18) and users (2) in communication with the former, using the same frequencies and times reusing frequency and time is achieved by means of controlling transmission gains in these kits, while the means of controlling reception has been described in the previous claims, so that the various head-end kits (18) communicate between themselves to take co-existence decisions.

17. Automatic gain control system for a digital OFDM multiuser transmission system over the electricity network, according to claim 1, wherein the coexistence of various groups of head-end (18) and users (2) in communication with the former, using the same frequencies and times reusing frequency and time is achieved by means of controlling transmission gains in these kits, while the means of controlling reception gains is achieved by the means as described in the previous claims, so that a principal head-end kit (1) exists that uses different frequencies and/or times for communication with its users (2), and is responsible for ensuring coexistence between the various groups of kits (18,2) that reuse the same frequencies and times and it is capable of communication with the head-end of each group (18).

18. Automatic gain control system for a digital OFDM multiuser transmission system over the electricity network, according to either of claim 16 and 17, wherein to optimise the gain control result when there are various groups of head-end (18) and users (2) reusing the same frequencies and times, transmission gains are modified carrier by carrier, or the average signal/nose ratio in frequency is estimated considering carriers with greater signal/noise ratio than those with less; using this result to achieve the modifications in transmission gains.

19. Automatic gain control system for a digital OFDM multiuser transmission system over the electricity network, according to any of claims 16 to 17, wherein the coexistence of various groups of head-end (18) and user kits (2) using the same range of frequencies and time for the communications, is carried out by means of:
power control in the corresponding signal emission means in both communication channels, downstream and upstream;
a network topology where the signals from all the user kits (2) first pass by the head-end kit corresponding to their group before arriving to the kits (18,2) that make up another group; and
measuring attenuation between the head-end kits (18), that reuse the same frequencies and times, by sending information between these head-end kits (18), or by means of communication with a principal head-end kit (1), so that this measure is used to adjust the maximum transmission power possible for the user kits (2).

20. Automatic gain control system for a digital OFDM multiuser transmission system over the electricity network, according to any of claims 16 to 17, wherein in the downstream channel all the head-end kits (18) emit at the maximum power possible for communication over the electricity network ($S_1,S_2$), so that the maximum value for the signal/noise (S/N) ratio (6) in the user receptors will be limited by the attenuation between the head-end kits (L) that reuse the same range of frequencies and times, while if there is a principal head-end (1), that uses another range of frequencies and/or times, it will be this principal head-end kit (1) that will be responsible for adjusting the different gains required in the various head-end kits (18) by means of channel control and preferably by means of control messages.

21. Automatic gain control system for a digital OFDM multiuser transmission system over the electricity network, according to any of claims 16 to 17, wherein to guarantee the coexistence of various groups of kits (2) that reuse the same frequencies and times in the upstream communication channel, transmission gain in the user kits (2) is adjusted so that the level of signal power that reaches the head-end (18) of another group, and that would be an interference for this group, is comparable to the level of noise on the line (9).

22. Automatic gain control system for a digital OFDM multiuser transmission system over the electricity network, according to claim 21, wherein in the upstream communication channel, the head-end kits (18) detect the power that arrives from one of its users and decides if the gain should be increased or decreased, later communicating this information to the user kit (2) involved preferable by means of control messages; the head-end (18) taking the corresponding decision by means of using the estimated value of the signal/noise ratio considered in frequency, prior values of said estimate and an estimation of noise.

23. Automatic gain control system for a digital OFDM multiuser transmission system over the electricity network, according to claim 18, wherein the coexistence of various groups of head-end (18) and user kits (2) using the same range of frequencies and time for the communications, is carried out by means of:

- power control in the corresponding signal emission means in both communication channels, downstream and upstream;
- a network topology where the signals from all the user kits (2) first pass by the head-end kit corresponding to their group before arriving to the kits (18,2) that make up another group; and
- measuring attenuation between the head-end kits (18), that reuse the same frequencies and times, by sending information between these head-end kits (18), or by means of communication with a principal head-end kit (1), so that this measure is used to adjust the maximum transmission power possible for the user kits (2).

24. Automatic gain control system for a digital OFDM multiuser transmission system over the electricity network, according to claim 18 wherein in the downstream channel all the head-end kits (18) emit at the maximum power possible for communication over the electricity network ($S_1$,$S_2$), so that the maximum value for the signal/noise (S/N) ratio (6) in the user receptors will be limited by the attenuation between the head-end kits (L) that reuse the same range of frequencies and times, while if there is a principal head-end (1), that uses another range of frequencies and/or times, it will be this principal head-end kit (1) that will be responsible for adjusting the different gains required in the various head-end kits (18) by means of channel control and preferably by means of control messages.

25. Automatic gain control system for a digital OFDM multiuser transmission system over the electricity network, according to claim 18, wherein to guarantee the coexistence of various groups of kits (2) that reuse the same frequencies and times in the upstream communication channel, transmission gain in the user kits (2) is adjusted so that the level of signal power that reaches the head-end (18) of another group, and that would be an interference for this group, is comparable to the level of noise on the line (9).

* * * * *